United States Patent [19]

Lansing

[11] Patent Number: 4,726,288
[45] Date of Patent: Feb. 23, 1988

[54] HEATABLE CONTAINER FOR FOOD PREPARATION MACHINE

[75] Inventor: James P. Lansing, St. Cloud, Minn.

[73] Assignee: JVJ Enterprises, Inc., St. Cloud, Minn.

[21] Appl. No.: 935,320

[22] Filed: Jan. 13, 1987

[51] Int. Cl.⁴ .............................................. A47J 37/12
[52] U.S. Cl. ........................................ 99/330; 99/331; 99/403; 99/410; 99/483; 219/432; 219/435; 219/436; 219/441
[58] Field of Search ...................... 99/330, 331, 329 R, 99/416, 414, 413, 410, 403, 411, 337, 336, 344, 483, 484, 486; 126/369; 219/432-436, 437, 441

[56] References Cited

U.S. PATENT DOCUMENTS

| Re. 29,609 | 4/1978 | Wadia et al. ......................... 219/441 |
| 2,725,460 | 11/1955 | Braski et al. ....................... 99/331 X |
| 3,213,778 | 10/1965 | Martino ................................ 99/329 R |
| 3,877,359 | 4/1975 | Keating ................................ 99/331 |
| 3,890,484 | 6/1975 | Kamins et al. ..................... 219/432 |
| 3,908,111 | 9/1975 | DuBois et al. ..................... 99/331 X |
| 4,520,717 | 6/1985 | Bohrer, Jr. et al. .................. 99/337 |
| 4,539,898 | 9/1985 | Bishop et al. ......................... 99/336 |
| 4,558,204 | 12/1985 | Bleckmann ..................... 219/436 X |
| 4,670,282 | 6/1987 | Onishi et al. .................... 219/441 X |

Primary Examiner—Timothy F. Simone
Attorney, Agent, or Firm—Kinney & Lange

[57] ABSTRACT

A heatable container assembly with a removable support cover containing a heater, sensors and interconnections.

7 Claims, 5 Drawing Figures

HEATABLE CONTAINER FOR FOOD PREPARATION MACHINE

BACKGROUND OF THE INVENTION

1. Field of the Invention

The present invention relates to enclosed machines for preparing food commercially in small quantities and, more particularly, relates to heatable containers in such machines.

Many kinds of sellers of prepared foods at retail are faced with providing such food in quantities small enough for a single serving. Various kinds of stand-alone food preparation machines have been developed for providing prepared food in single serving quantities.

Among the kinds of these machines which have been developed is a food preparation machine for the deep-fat frying of food in quantities for one, or a few, servings. Such machines can be used to prepare french-fried potatoes, fish pieces, chicken pieces or the like.

A machine for doing this is shown in FIG. 1. There, two baskets, 10, are shown which can be filled with such kinds of food as are desired to have fried in cooking oil. A motorized transport mechanism can be activated to lower baskets 10 into a container or vat, 11, of cooking oil. Most of the motor parts for the transport mechanism, the motor control circuitry, and other control circuitry, can be mounted and contained in a box, 12, shown in the interior of the machine in FIG. 1. Controls for operating the machine can extend through one of the panels enclosing the machine on the right-hand side thereof. Shown above these controls is a fire extinguisher provided as a safety measure and directed into the interior of the enclosure formed by the outer panels of the machine.

During operation, some oil is splattered about and, in any event, the oil ages during use, and so, certain residues accumulate on container 11. This necessitates the changing of the oil in, and the cleaning of, container 11.

Heretofore, the containers used as a container 11 were operated with a molded-in heating element affixed thereto. During cleaning operations where the use of a solvent cleaner was resorted to, as is necessary after awhile, the solvent in many instances gets into the heating elements inside the molding in the casting. This leads to either shorting out the heating elements, or the burning out of them, necessitating discarding of the entire container with the failed heater. Furthermore, various other components in such configuration were mounted directly to the container necessitating a time consuming and inconvenient effort to remove them before cleaning or otherwise risk their damage also in the cleaning process. An arrangement for providing heaters and other components would be desirable where they could all be removed to permit cleaning of the container alone.

SUMMARY OF THE INVENTION

The present invention provides a support cover with heaters and other elements mounted thereon which can be fastened to the container by removable fasteners to permit removing the heater and other elements as a single assembly.

DETAILED DESCRIPTION OF THE PREFERRED EMBODIMENTS

Figure 2:
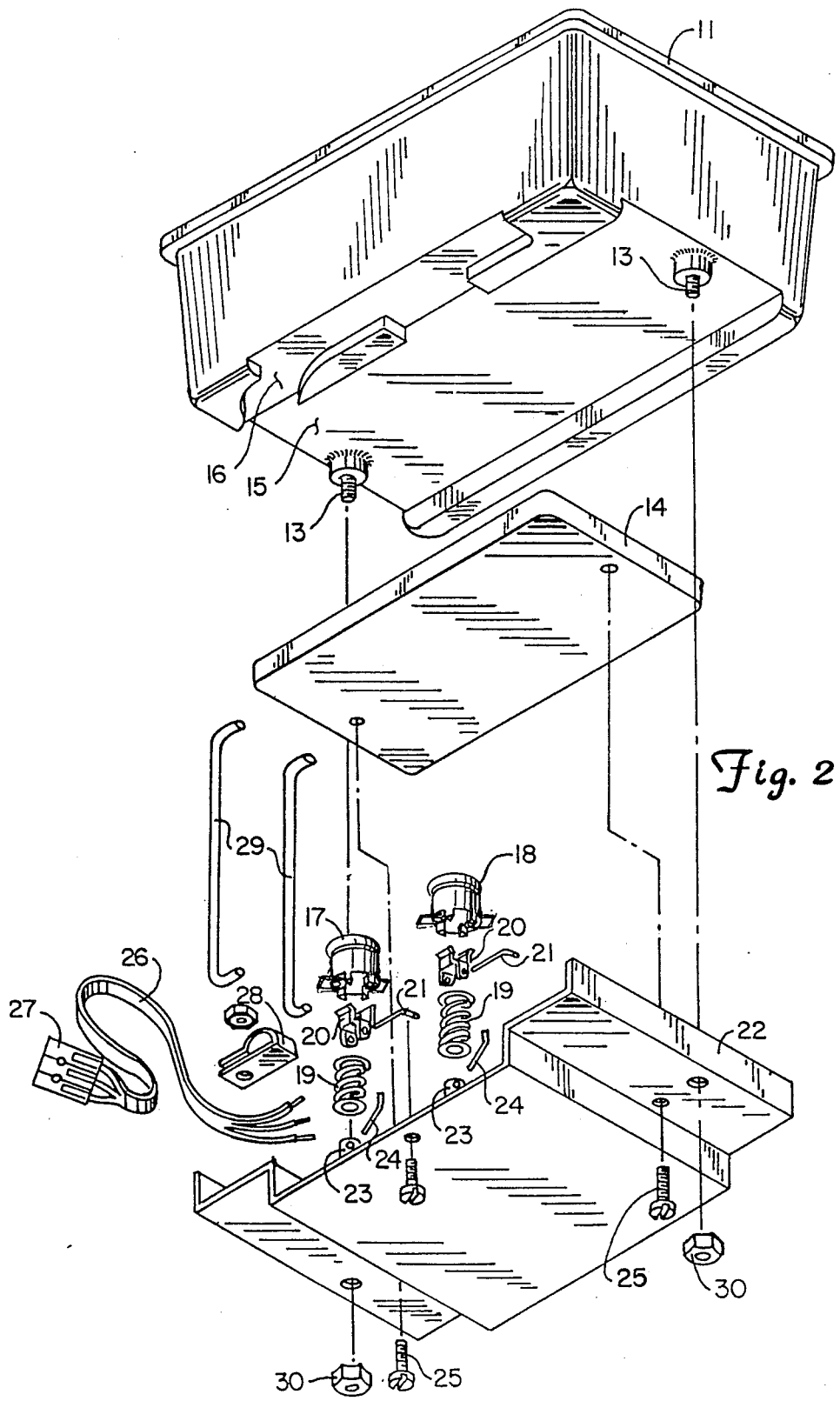
FIG. 2 shows an exploded view of the heatable container assembly of the present invention.

FIG. 2 shows an exploded view of a heatable container assembly which can be removed as a unit from the food preparation machine. Container 11, shown at the top of the view, is a container formed of cast aluminum bottom and side walls with two threaded studs, 13, projecting from bosses in, or affixed to, the casting. These bosses are located in a recessed space to accommodate a heater, 14. The surface of this recessed space, 15, is the heating surface of the container against which heater 14 is placed with a similarly flat surface to provide heat to the contents of the container.

Another recess in front of this heating surface forms a sensing surface, 16. Against this surface are forced two thermostatic switches, 17 and 18, this forcing being provided by springs, 19. Springs 19 are affixed to the bottom of each of switches 17 and 18 by an interface bracket, 20, and a pin, 21. The other ends of spring 19 are fixed to a formed stainless steel sheet serving as a support cover, 22. Support cover 22 has two bosses, 23, which fit within springs 19 where they are pinned with further pins, 24.

Heater 14 is affixed to support cover 22 by two pan head screws, 25. Also affixed to support cover 22 is an interconnection wiring harness, 26. Harness 26 has one member, 27, of an insertable plug set pair electrically connected to one end thereof. Slide clip terminals are used on the opposite ends of the wires in harness 26. A wiring bracket, 28, and its associated screw and nut affix the wire harness to cover 22. Further shown are a pair of interconnecting wires, 29, having slide clip terminals on either end thereof.

The support cover assembly comprises everything shown in FIG. 2, other than container 11, and all these parts other than cover 22 are assembled to support cover 22. This support cover assembly can then be fastened to container 11 through holes in the support cover which permit threaded studs 13 to pass through cover 22. Support cover 22 is then held in place by threaded nuts, 30, which can be threaded onto studs 13 over support cover 22. Thus, the removal of threaded nuts 30 from studs 13 permits the separation of the entire support cover assembly from container 11. Thereafter, container 11 can be immersed in a solvent, or scrubbed by a solvent, without concern for the heater, thermostatic switches or other components mounted on support cover 22 coming under attack by the solvent.

Note that heating surface 15 and sensing surface 16 are each recessed in the bottom wall of container 11. This improves the heat transfer through surface 15 for heating the contents of container 11, and improves the accuracy of the sensing at sensing surface 16 by thermostatic switches 17 and 18 because of the relative ease of heat transfer therethrough. The upper surface of heater 14 fits in the recess against this similarly flat heating surface 15 to provide for good thermal transfer from heater 14 to container 11. On the other hand, support cover 22 is formed so that a center portion supports all of the components except heater 14. Instead, heater 14 is mounted by threaded screws 25 on a couple of support cover flats which are above the bottom surface of cover 22. These raised flats result in a space between most of cover 22 and heater 14 to thereby reduce heat transfer to cover 22 from heater 14.

Figure 3:
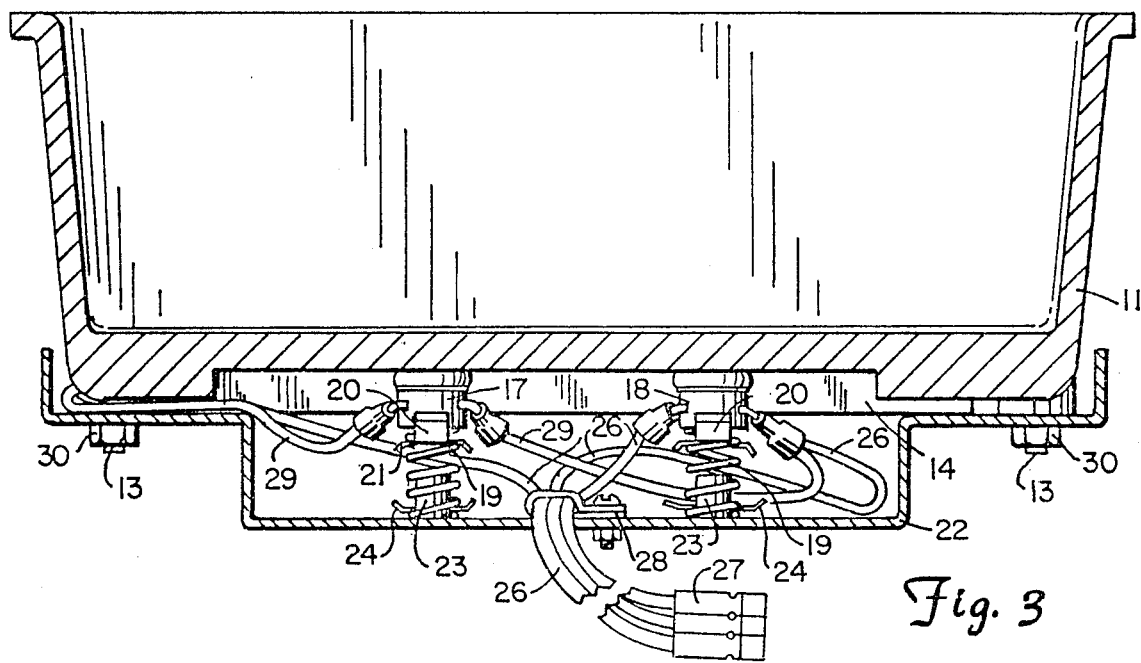
FIG. 3 shows another view in cross section of this same assembly.
Figure 4:
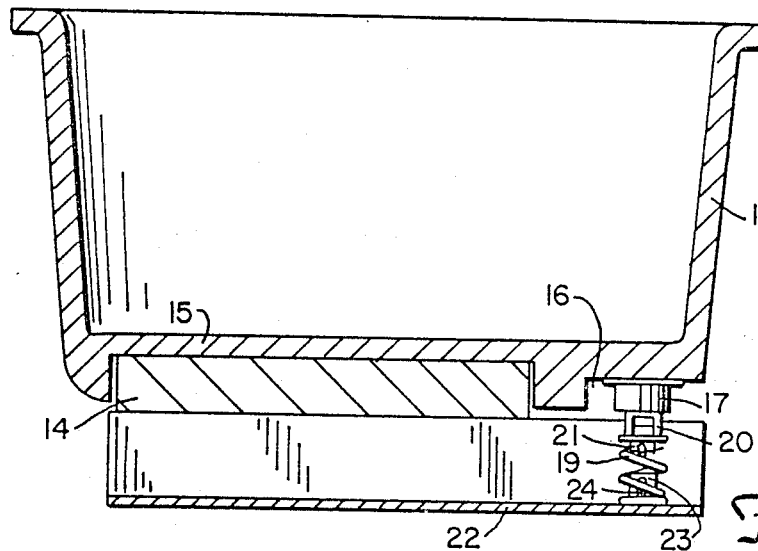
FIG. 4 shows yet another cross section view of this assembly.

The cross-sectional views in FIGS. 3 and 4 show this arrangement more clearly. The cross-section view in FIG. 3 is taken through a portion of the sensing surface just behind the forward facing wall of container 11 in FIG. 2. The cross-sectional view in FIG. 4 is taken inside the left-hand wall of container 11 as shown in FIG. 2 with the wiring eliminated to make this view clearer. From these views, heater 14 can be seen in the recess in the bottom wall of container 11 having its upper heating surface flush against the heating surface 15 in the recess of the bottom wall of container 11. Thermostatic switch 17 can be seen flush against sensing surface 16 of container 11.

Figure 1:
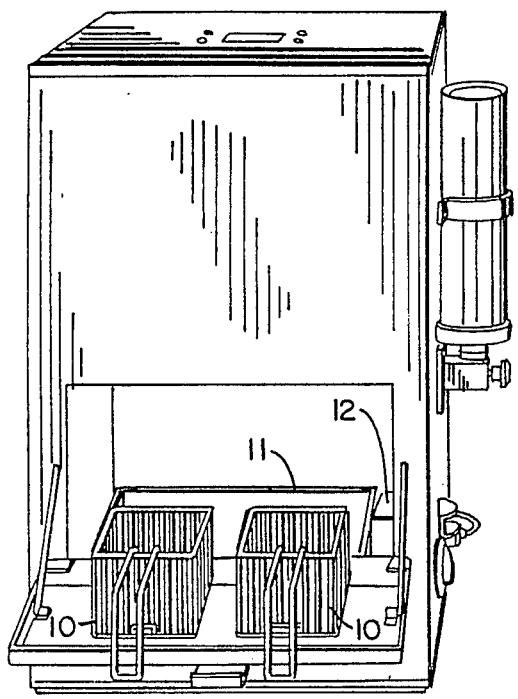
FIG. 1 shows generally an enclosed food preparation machine for deep fat frying.
Figure 5:
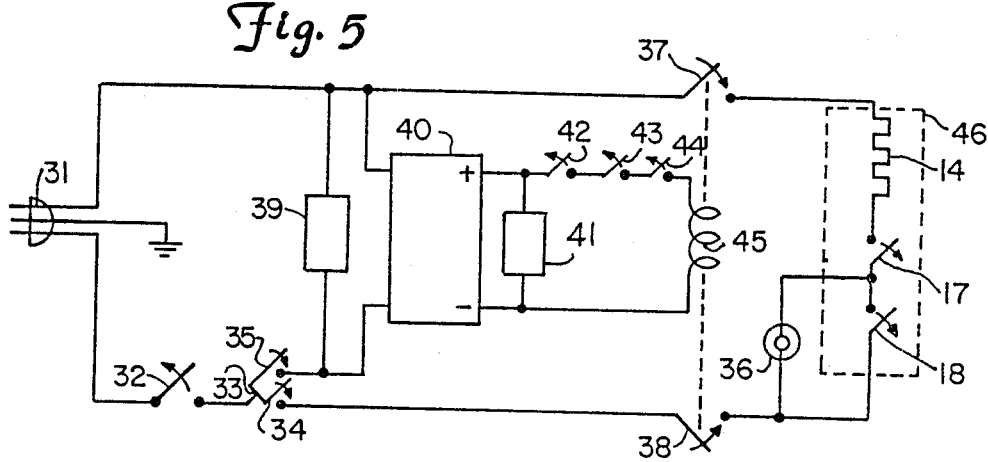
FIG. 5 shows a schematic circuit diagram of some aspects of the electrical system used with the present invention.

FIG. 5 shows the schematic electrical diagram of the electrical circuitry used in operating heatable container 11 in the food preparation machine of FIG. 1. A 120 V plug, 31, accepts alternating voltage and current for the remaining circuitry. A first safety switch, 32, is part of the fire extinguisher apparatus. A second switch, 33, is a double pole switch serving as the on-off switch in controlling the food preparation machine after plug 31 is plugged into a source of alternating voltage. One pole, 34, of switch 33 provides electrical power to the heating circuitry. The other pole, 35, provides power for the remaining portions of the circuitry. The use of two poles eliminates having the large current drawn by the heating circuitry flow through the same switch contacts as the current drawn to operate the remainder of the circuitry.

Heater 14 is chosen as an electrical resistance heater and, in FIG. 5, is provided in series with primary thermostatic switch 17 and over-temperature thermostatic switch 18. An over-temperature indicator light, 36, is shown in parallel across over-temperature switch 18 so that the opening of over-temperature switch 18 leads to light 36 being switched on. Primary thermostatic switch 17 is set to open at temperatures greater than 385° F. and over-temperature switch 18 is set to open at temperatures above 395° F.

This series combination is connected to the alternating voltage supplied through plug 31 and switches 32 and 33 by relay control switches, 37 and 38. Electrical power to operate the relay solenoid is provided through switch 33 and pole 35 which is also provided to other alternating voltage operating components indicated in FIG. 5 as a group within a box designated 39.

The electrical power to operate the relay is applied to a step-down transformer, rectifier and voltage regulator indicated as group by a box designated 40. Box 40, thus serving as a direct voltage source of a value of 12 V between its output terminals, supplies electrical power to other direct voltage operated components indicated as a group in a box designated 41 in FIG. 5. The voltage is also applied to three safety switches, 42, 43 and 44, and then the coil, 45, of a relay. The relay comprises coil 45 and solenoid operated switches 37 and 38.

Electrical power is always supplied to coil 45 to hold switches 37 and 38 closed upon the supply of alternating voltage by a plug 31 unless any of safety switches 42, 43 or 44 open (or safety switch 32 or on-off switch 33). Switch 42 is an air temperature thermostatic switch sensing air temperature in the cooking chamber, and will open if that air temperature exceeds a set value. Switches 43 and 44 are magnetic switches, which open in the absence of magnetizable metal in the proper positional relation to them. These switches are placed within the food preparation machine to assure that the heater 14 cannot heat if the front cover has been removed from the machine or if the container 11 is not in its place.

Thus, heater 14 will heat continually if everything is normal once the plug 31 has a voltage applied thereto and on-off switch 35 is closed. Heating will continue until the temperature sensed by switch 17 exceeds 385° F. at which time that switch will open to discontinue heating until the contents of container 11 have sufficiently cooled to allow switch 17 to again close. Any failure of switch 17 will lead to a similar action for switch 18. As a result, once operation of the food preparation machine is decided upon by its operator, cooking oil in container 11 will be kept at a temperature of approximately 385° F. until the machine is switched off.

The circuit portions shown within the dashed line box designated 46 are the circuit portions shown in FIGS. 2 and 3. That is, the circuit components mounted on support cover 22, and the wiring therefor, are represented in electrical schematic form by the diagram portion contained within dashed line box 46.

What is claimed is:

1. A heatable container assembly for use in an enclosed food preparation machine, said container assembly having a container for heating cooking mixtures at least some portions of which mixtures must be cleaned from said container on occasion requiring removal of said container assembly from its enclosure followed by applying a solvent to said container, said container assembly comprising:

said container formed of thermally conductive material walls having a heating surface and a sensing surface, and having at least one fastner place for accepting a fastner;

a support cover assembly comprising:
a support cover,
a plurality of thermostatic switches each mounted to said support cover by a compressible spring, and
a heater having electrical heating elements and a heating surface shaped similarly to said container heating surface which is heatable by said electrical heating elements;

a removable fastener which fastens at said container fastening place and, in doing so, fastens said support cover to said container such that said heater heating surface is against said container heating surface and such that said thermostatic switches are against said container sensing surface; and an interconnection wire harness electrically interconnecting said thermostatic switches and said heater, and having one member of an insertable plug set electrically connected to one end thereof.

2. The apparatus of claim 1 wherein said container heating surface is formed in a recess in a said container wall.

3. The apparatus of claim 1 wherein said container sensing surface is formed in a recess in a said container wall.

4. The apparatus of claim 1 wherein there is an open space between portions of said support cover and said heater.

5. The apparatus of claim 2 wherein said container sensing surface is formed in a recess in a said container wall.

6. The apparatus of claim 2 wherein there is an open space between portions of said support cover and said heater.

7. The apparatus of claim 3 wherein there is an open space between portions of said support cover and said heater.

* * * * *